United States Patent
Venter et al.

(10) Patent No.: US 11,677,462 B1
(45) Date of Patent: Jun. 13, 2023

(54) LANDMARK CORRELATION MECHANISM

(71) Applicant: VeEX Inc., Fremont, CA (US)

(72) Inventors: Michael Deon Venter, Gilroy, CA (US); Tommie Miles Jones, Cumming, GA (US); Eugene Belianka, Fanipol (BY)

(73) Assignee: VeEX, Inc., Fremont, CA (US)

( * ) Notice: Subject to any disclaimer, the term of this patent is extended or adjusted under 35 U.S.C. 154(b) by 30 days.

(21) Appl. No.: 17/307,768

(22) Filed: May 4, 2021

Related U.S. Application Data

(60) Provisional application No. 63/026,543, filed on May 18, 2020.

(51) Int. Cl.
  *H04B 10/07* (2013.01)
  *H04B 10/071* (2013.01)
  *H04B 10/077* (2013.01)

(52) U.S. Cl.
  CPC ....... *H04B 10/071* (2013.01); *H04B 10/0771* (2013.01)

(58) Field of Classification Search
  CPC ............ H04B 10/071; H04B 10/07955; H04B 10/0797; H04B 10/27; H04Q 11/0062
  See application file for complete search history.

(56) References Cited

U.S. PATENT DOCUMENTS

| | | | |
|---|---|---|---|
| 8,472,340 B1 * | 6/2013 | Lo ....................... | H04L 41/0886 370/252 |
| 8,495,691 B1 * | 7/2013 | Kondapalli ............... | G06F 3/14 725/25 |
| 2004/0233874 A1 * | 11/2004 | Baker .............. | H04B 10/25759 370/335 |
| 2021/0211193 A1 * | 7/2021 | Archambault ....... | H04B 10/071 |

* cited by examiner

*Primary Examiner* — Dzung D Tran
(74) *Attorney, Agent, or Firm* — Sheppard Mullin Richter & Hampton LLP

(57) ABSTRACT

Systems, methods, and non-transitory computer readable media are configured to determine an optical length of an event in a cable. A physical length of the event in the cable can be determined based on a correlation between optical lengths and physical lengths in the cable. A geographic location of the event can be provided based on the physical length of the event.

20 Claims, 12 Drawing Sheets

LANDMARK CORRELATION MECHANISM

CROSS-REFERENCE TO RELATED APPLICATIONS

This application claims priority to U.S. Provisional Patent Application No. 63/026,543, filed on May 18, 2020 and entitled "LANDMARK CORRELATION MECHANISM," which is incorporated herein by reference in its entirety.

FIELD OF THE INVENTION

The present technology relates to optical networks. More particularly, the present technology relates to determining a geographic location of an event in a fiber optic cable.

BACKGROUND

Increasing growth in data traffic has spurred rapid development in fiber optic (or optical fiber) communication technology. In addition to the rapid development in fiber optic communication technology, the increasing growth in data traffic has spurred rapid deployment of fiber optic cables. In general, fiber optic cables support data transmission bandwidths that are faster than those of copper cables because fiber optic cables use light to carry data. At the same time, the use of light introduces new technological challenges in maintaining and repairing fiber optic cables. Sometimes, events (e.g., faults, breaks) can occur in fiber optic cables. The events can be unpredictable and challenging to troubleshoot. Mean Time to Repair (MTTR) is a common maintenance metric that measures the average time to troubleshoot an event. Reducing MTTR remains a goal in maintenance and repair of fiber optic cables.

SUMMARY

Various embodiments of the present technology can include systems, methods, and non-transitory computer readable media configured to determine an optical length of an event in a cable. A physical length of the event in the cable can be determined based on a correlation between optical lengths and physical lengths in the cable. A geographic location of the event can be provided based on the physical length of the event.

In an embodiment, the physical length of the event in the cable can be determined further based on two closest reference points for the cable. A first reference point of the two closest reference points has a first optical length shorter than the optical length of the event in the cable and a second reference point of the two closest reference points has a second optical length longer than the optical length of the event in the cable.

In an embodiment, the physical length of the event in the cable can be determined further based on a linear interpolation that involves at least one of: the optical length of the first reference point, a physical length of the first reference point, the optical length of the second reference point, or a physical length of the second reference point.

In an embodiment, a reference point for the cable can be determined based on a confirmation or a modification of the geographic location of the event.

In an embodiment, the geographic location of the event can be determined based on a geographical route associated with the cable.

In an embodiment, providing the geographic location of the event includes providing a geographical map that includes an indicator that indicates the geographical location of the event on the geographical map.

In an embodiment, providing the geographic location of the event includes providing a latitudinal and longitudinal coordinate of the event.

In an embodiment, the optical length of the event in the cable can be determined based on an optical time domain reflectometer (OTDR) trace.

In an embodiment, the correlation between optical lengths and physical lengths in the cable is based on a record of reference points for the cable.

In an embodiment, the reference points include at least one of: a repair in the cable, a splice in the cable, a connector in the cable, a reflector in the cable, a splitter in the cable, or a slack coil in the cable.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

Figure 1:
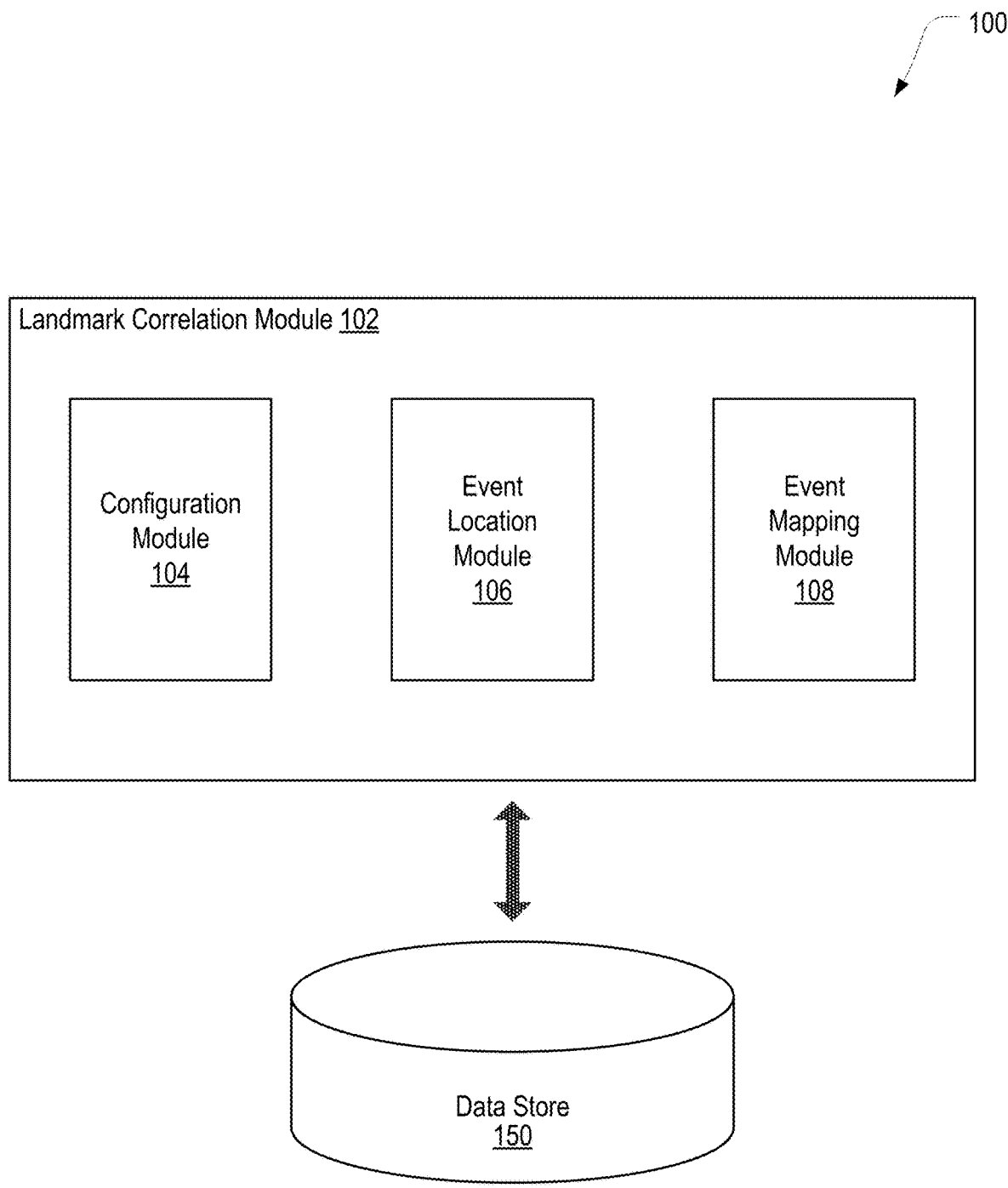
FIG. 1 illustrates an example system including a landmark correlation module, according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Landmark Correlation

Increasing growth in data traffic has spurred rapid development in fiber optic (or optical fiber) communication technology. In addition to the rapid development in fiber optic communication technology, the increasing growth in data traffic has spurred rapid deployment of fiber optic cables. In general, fiber optic cables support data transmission bandwidths that are faster than those of copper cables because fiber optic cables use light to carry data. At the same time, the use of light introduces new technological challenges in maintaining and repairing fiber optic cables. Sometimes, events (e.g., faults, breaks) can occur in fiber optic cables. The events can be unpredictable and challenging to troubleshoot. Mean Time to Repair (MTTR) is a common maintenance metric that measures the average time to troubleshoot an event. Reducing MTTR remains a primary goal in maintenance and repair of fiber optic cables.

Under conventional approaches, determining a precise physical location of an event that occurs in a fiber optic cable is a challenge that can negatively impact MTTR. The event can have an optical length and a physical length, which can be different from the optical length due to, for example, a helix factor or cable construction. The optical length of the event can be a distance travelled by an optical signal in the fiber optic cable from a start of the fiber optic cable to the event. The physical length of the event can be a geographic distance along a geographic route of the fiber optic cable from the start of the fiber optic cable to the event. Typically, the optical length and the physical length of the event are not equal. Several factors can contribute to discrepancies between an optical length of an event and a physical length of the event. These factors can include, for example, slack left during deployment of the fiber optic cable, coils in the fiber optic cable, a helix factor of the fiber optic cable, and errors in an Index of Refraction (IoR) of the fiber optic cable. Accordingly, under conventional approaches, a physical length of an event in a fiber optic cable cannot be determined based on an optical length of the event. Thus, under conventional approaches, a geographic location of the event in the fiber optic cable cannot be determined based on the optical length of the event. Without the geographic location of the event in the fiber optic cable, the event in the fiber optic cable can be difficult to find and repair. This difficulty in finding and repairing an event negatively impacts MTTR. Conventional approaches fail to address these and other challenges arising in communication technology.

An improved approach rooted in computer technology overcomes the foregoing and other challenges arising in communication technology under conventional approaches. In various embodiments, the present technology provides for determining a geographical location of an event (e.g., fault, break) in a cable (e.g., fiber optic cable) based on an optical length associated with the event in the cable. The geographical location of the event can be determined based on the optical length using correlations between optical lengths and physical lengths for the cable. The correlations can be determined from landmarks in the cable. The landmarks can include physical alterations in the cable, such as a repair in the cable, a splice in the cable, a connector in the cable, a reflector in the cable, a splitter in the cable, or a slack coil in the cable. The landmarks can also include physical points in the cable, such as a start of the cable or an end of the cable. Optical lengths and physical lengths can be determined for the landmarks in the cable. The optical lengths and the physical lengths associated with the landmarks in the cable can be correlated and used as reference points for the cable. In some cases, the reference points can also include geographical locations associated with the landmarks. A map of the cable can be generated based on the geographical locations associated with the landmarks in the cable. For example, an event can be detected in the cable. An optical length of the event in the cable can be determined. Based on the optical length of the event and the reference points of the cable, a physical length of the event can be determined. Based on the physical length of the event, a geographical location of the event can be determined. In some cases, an event in a cable can be determined and geographically located, for example, based on the aforementioned technology, and the event in the cable can be repaired. A geographical location, a physical length, and an optical length as determined for one event can be used as a reference point for the cable to facilitate geographical location of another event. Thus, the present technology provides for technological solutions to technological challenges by enabling efficient and accurate location of events in cables. More details relating to the present technology are provided below.

In most cases, an event in a cable can be determined based on a Remote Fiber Test System (RFTS). The RFTS employs an optical time domain reflectometer (OTDR) to evaluate characteristics of fiber in the cable. The OTDR compares new measurements of the characteristics of the cable against known baseline levels. Deviations from the baseline levels are reported as events in the cable. The RFTS can determine an optical length of the event by sending a signal and measuring an amount of time for the signal to reflect and return to the RFTS. The events can be reported, for example, via Simple Network Management Protocol (SNMP) trap messages. The events can also be reported, for example, via Application Programming Interface (API) calls to a centralized Network Operation Center (NOC). The NOC can report the event to cable technicians via email or Short Message Service (SMS). The SMS can include, for example, an optical length and a reflectance and insertion loss associated with the event in the cable. While determining an event in a cable based on an RFTS is provided as an example, it should be understood that other techniques can be used to determine an event in the cable.

FIG. 1 illustrates an example system 100 including an example landmark correlation module 102, according to an embodiment of the present technology. As shown in the example of FIG. 1, the landmark correlation module 102 can include a configuration module 104, an event location module 106, and an event mapping module 108. In some instances, the example system 100 can include at least one data store 150. The components (e.g., modules, elements, etc.) shown in this figure and all figures herein are exemplary only, and other implementations can include additional, fewer, integrated, or different components. Some components may not be shown so as not to obscure relevant details.

In some embodiments, the landmark correlation module 102 can be implemented, in part or in whole, as software, hardware, or any combination thereof. In some cases, the landmark correlation module 102 can be implemented, in part or in whole, as software running on one or more computing devices or systems. For example, the landmark correlation module 102 or at least a portion thereof can be implemented as or within an application (e.g., app), a program, an applet, or an operating system, etc., running on a user computing device or a client computing system. In a further example, the landmark correlation module 102 or at least a portion thereof can be implemented using one or more computing devices or systems that include one or more servers, such as network servers or cloud servers. The landmark correlation module 102 or at least a portion thereof can be implemented using computer system 700 of FIG. 7. It should be understood that there can be many variations or other possibilities.

The landmark correlation module 102 can be configured to communicate and/or operate with the at least one data store 150, as shown in the example system 100. The at least one data store 150 can be configured to store and maintain various types of data. For example, the data store 150 can store information used or generated by the landmark correlation module 102. The information used or generated by the landmark correlation module 102 can include, for example, optical lengths, physical lengths, and geographical locations associated with events in a cable.

In various embodiments, the configuration module 104 can generate a record of reference points for a cable. The reference points can be based on landmarks and events associated with the cable. The landmarks can include physical points along the cable. The physical points can include, for example, a start of the cable, an end of the cable, a repair in the cable, a splice in the cable, a connector in the cable, a slack coil in the cable, a manhole, a handhole, and any other physical point in the cable. The events can include, for example, faults or breaks that occur in the cable. The reference points for the cable can be associated with optical lengths and physical lengths. For example, a new fiber optic cable can be deployed. Reference points for the new fiber optic cable initially can include a start of the new fiber optic cable and an end of the new fiber optic cable. The reference points can be associated with optical lengths and physical lengths of the start of the new fiber optic cable and the end of the new fiber optic cable. An example table of reference points for the new fiber optic cable is provided below:

| Reference Point | Optical Length | Physical Length |
|---|---|---|
| Start Fiber | 0 m | 0 m |
| End Fiber | 30000 m | 28000 m |

In the example table, the start of the new fiber optic cable has an optical length of 0 meters and a physical length of 0 meters. The end of the new fiber optic cable has an optical length of 30,000 meters and a physical length of 28,000 meters. As illustrated in this example, the optical length of the new fiber optic cable is longer than the physical length of the new fiber optic cable by 2,000 meters. The extra 2,000 meters can be due to, for example, intrinsic properties, such as an Index of Refraction (IoR), or extrinsic factors such as a helix factor or slack left during deployment of the new fiber optic cable. A main reason for difference between optical length and physical length of fiber optic cable is a difference in the IoR between glass in the fiber optic cable and air.

The configuration module 104 can add reference points to a record of reference points for a cable based on events in the cable. When an event in a cable is detected, an optical length of the event can be determined. When the event in the cable is resolved, a physical length of the event can be determined. The physical length of the event can be determined based on, for example, a geographical location of the event and a mapping of how the cable was deployed. The optical length and the physical length of the event, or a landmark associated with resolution of the event, can be added as a reference point to a record of reference points for the cable. For example, an event can be determined in a fiber optic cable. The event can be resolved by installing a splice in the fiber optic cable where the event occurred. The optical length and the physical length of the splice can be added as a reference point to a record of reference points for the fiber optic cable. An example table of reference points for the fiber optic cable is provided below:

| Reference Point | Optical Length | Physical Length |
|---|---|---|
| Start Fiber | 0 m | 0 m |
| Splice 1 | 12,000 m | 10,000 m |
| End Fiber | 30,000 m | 28,000 m |

In the example table, a start of the fiber optic cable has an optical length of 0 meters and a physical length of 0 meters. An end of the fiber optic cable has an optical length of 30,000 meters and a physical length of 28,000 meters. The splice (e.g., splice 1) has an optical length of 12,000 meters and a physical length of 10,000 meters. As illustrated in this example, the optical length of the fiber optic cable from the start of the fiber optic cable to the splice is longer than the physical length of the fiber optic cable from the start of the fiber optic cable to the splice by 2,000 meters. The extra 2,000 meters in optical length from the start of the fiber optic cable to the splice can be due to, for example, slack left during deployment of the fiber optic cable. The lack of extra length in optical length from the splice to the end of the fiber optic cable can indicate, for example, an absence of slack in the fiber optic cable between the splice and the end of the fiber optic cable.

In some cases, a reference point for a cable can be based on a user defined landmark or a planned event. A user defined landmark can be a physical point in a cable identified by a user. In some cases, a demarcation device (e.g., reflector) can be inserted in the cable during construction of the cable, and the demarcation can serve as a landmark. A reference point for the cable can be determined based on an optical length and a physical length associated with the physical point identified by the user. A planned event can be an induced event in a cable, such as a temporary bend in the cable or a temporary application of a clamp to the cable. A reference point for the cable can be determined based on an optical length and a physical length associated with the planned event. For example, a cable technician can record a location of a slack coil in a fiber optic cable. Reference points for the fiber optic cable can be recorded based on the slack coil. An example table of reference points for the fiber optic cable is provided below:

| Reference Point | Optical Length | Physical Length |
|---|---|---|
| Start Fiber | 0 m | 0 m |
| Splice 1 | 11000 m | 10000 m |
| Slack Start | 13000 m | 11999 m |
| Slack End | 14000 m | 12000 m |
| End Fiber | 30000 m | 28000 m |

In the example table, a start of the fiber optic cable has an optical length of 0 meters and a physical length of 0 meters. A splice in the fiber optic cable has an optical length of 11,000 meters and a physical length of 10,000 meters. An end of the fiber optic cable has an optical length of 30,000 meters and a physical length of 28,000 meters. The fiber optic cable also has two reference points for where the slack coil starts and the slack coil ends. A start of the slack coil has an optical length of 13,000 meters and a physical length of 11,999 meters. An end of the slack coil has an optical length of 14,000 meters and a physical length of 12,000 meters. As illustrated in this example, the optical length between the start of the slack coil and the end of the slack coil is 1,000 meters. The physical length between the start of the slack coil and the end of the slack coil is 1 meter. The optical length between the start of the slack coil and the end of the slack coil and the physical length between the start of the slack coil and the end of the slack coil can indicate that the slack coil includes 1,000 meters of fiber optic cable coiled in 1 meter of space.

In some cases, a reference point for a cable can be associated with a geographical location. The cable can be associated with a geographical route corresponding with how the cable was deployed. The geographical location can indicate a point on the geographical route corresponding with a physical length of the reference point. A geographical location associated with a reference point for a cable can include, for example, a latitudinal and a longitudinal coordinate. In some cases, the geographical location can be associated with a physical marker, such as a manhole, an intersection, or a building.

In some cases, a record of reference points for a cable can be based on a Standard OTDR Record (SOR) file. The SOR file can represent a trace generated by an OTDR instrument when testing a cable. The SOR file can characterize the cable under test and contain trace data that correlates optical length with reflectance, loss, and fiber attenuation measurements of the cable. The SOR file can identify optical lengths of events and landmarks in the cable. The record of reference points for the cable can be based on these optical lengths.

In various embodiments, the event location module 106 can determine a physical length of an event in a cable. The physical length of the event in the cable can be determined based on an optical length of the event and a record of reference points for the cable. A range of physical lengths of the event can be determined based on reference points with optical lengths longer than the optical length of the event and reference points with optical lengths shorter than the optical length of the event. An upper limit of the range can be based on a reference point with an optical length longer than the optical length of the event. The reference point on which the upper limit of the range is based can be, for example, the reference point with the smallest optical length that is longer than the optical length of the event. A lower limit of the range can be based on a reference point with an optical length shorter than the optical length of the event. The reference point on which the lower limit of the range is based can be, for example, the reference point with the longest optical length that is shorter than the optical length of the event. Within the range, a physical length of the event can be determined based on reference points closest to the event with respect to their optical lengths. In some cases, the physical length of the event can be determined based on a linear interpolation involving the reference point closest to the event with a longer optical length than the optical length of the event and the reference point closest to the event with a shorter optical length than the optical length of the event. In some cases, the physical length of the event can be determined based on a formula:

$$Y = \frac{(X - X_1)(Y_3 - Y_1)}{(X_3 - X_1)} + Y_1$$

where Y is the physical length of the event; X is the optical length of the event; $X_1$ is the optical length of a reference point closest to the event with a shorter optical length than the optical length of the event; $X_3$ is the optical length of a reference point closest to the event with a longer optical length than the optical length of the event; $Y_1$ is the physical length of the reference point closest to the event with a shorter optical length than the optical length of the event; $Y_3$ is the physical length of the reference point closest to the event with a longer optical length than the optical length of the event. For example, an OTDR event can be detected in a fiber optic cable. An optical length can be determined for the OTDR event. An example table of reference points for the fiber optic cable and the OTDR event is provided below:

| Reference Point | Optical Length | Physical Length |
| --- | --- | --- |
| Start Fiber | 0.0 km | 0.0 km |
| Connector A | 1.0 km | 0.6 km |
| OTDR Event | 1.7 km | |
| Splice 1 | 2.4 km | 1.1 km |
| Connector B | 3.0 km | 1.6 km |
| Splice 2 | 3.5 km | 2.0 km |
| End Fiber | 5.0 km | 3.8 km |

In the example table, the OTDR event has an optical length of 1.7 kilometers. Connector A is the closest reference point with an optical length shorter than the optical length of the OTDR event. Connector A has an optical length of 1.0 kilometers and a physical length of 0.6 kilometers. Splice 1 is the closest reference point with an optical length longer than the optical length of the OTDR event. Splice 1 has an optical length of 2.4 kilometers and a physical length of 1.1 kilometers. The physical length of the OTDR event can be determined based on a formula:

$$Y = \frac{(1.7 \text{ km} - 1.0 \text{ km})(1.1 \text{ km} - 0.6 \text{ km})}{(2.4 \text{ km} - 1.0 \text{ km})} + 0.6 \text{ km}$$

where Y is the physical length of the OTDR event. Based on the formula, the physical length of the OTDR event, in this example, is 0.85 kilometers.

In various embodiments, the event mapping module 108 can determine a geographical location of an event in a cable. The geographical location of the event in the cable can be determined based on a physical length of the event and a geographical route of how the cable was deployed. In some cases, a geographical location of an event in a cable can be determined by following a geographical route of how the cable was deployed for a distance corresponding with a physical length of the event in the cable. For example, a physical length of an event in a cable can be 0.85 kilometers. A geographical location of the event in the cable can be determined by following a geographical route of how the cable was deployed from a start of the cable for 0.85 kilometers. In some cases, a geographical location of an event in a cable can be determined by following a geographical route of how the cable was deployed from a geographical location of a reference point. For example, a physical length of an event in a cable can be 0.85 kilometers. A closest reference point for the cable can have a physical length of 0.5 kilometers. A geographical location of the event can be determined by following a geographical route of how the cable was deployed from a geographical location of the closest reference point for 0.35 kilometers.

The event mapping module 108 can provide a geographical location of an event in a cable through a map displayed on a user interface. The map can include an indicator that indicates the geographical location of the event in the cable. In some cases, the map can include a geographical route of how the cable was deployed, indicators that indicate geographical locations of reference points for the cable, and geographical locations of physical markers. By providing a geographical location of an event in a cable through a map displayed on a user interface, a user can quickly determine where the event in the cable is located and navigate to the geographical location.

Figure 2:
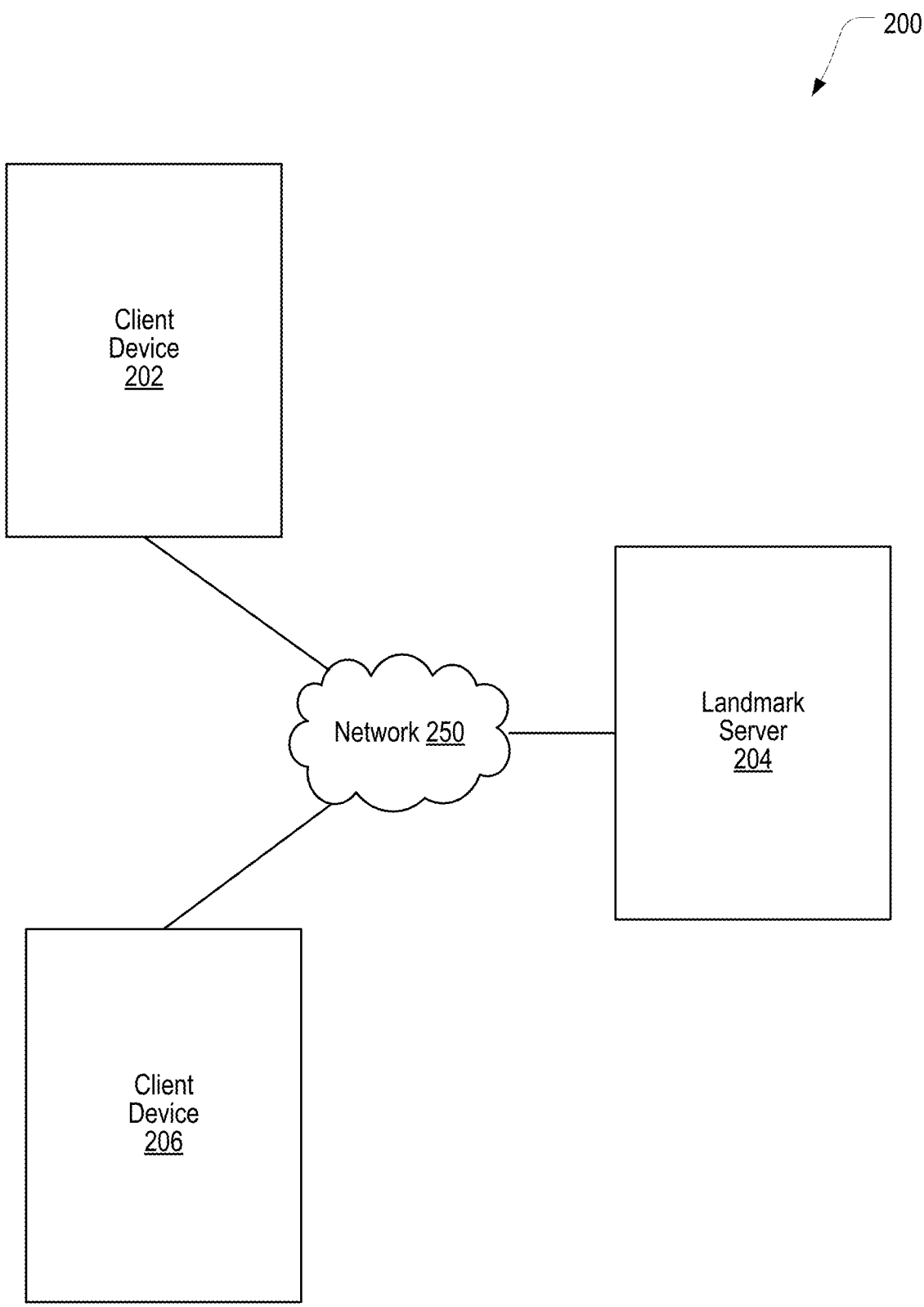
FIG. 2 illustrates an example system including a landmark server, according to an embodiment of the present technology.

FIG. 2 illustrates an example system 200, according to an embodiment of the present technology. The example system 200 illustrates examples of client devices 202, 206 and a landmark server 204 that can implement some or all of the functionality of the landmark correlation module 102 of FIG. 1. It should be understood that there can be additional, fewer, or alternative steps performed in similar or alternative orders, or in parallel, based on the various features and embodiments discussed herein unless otherwise stated.

In the example system 200, a first client device 202 and a second client device 206 can communicate with a landmark server 204 over a network 250. The first client device 202 can be associated with a first user. The second client device 206 can be associated with a second user. In this example, the landmark server 204 can maintain records of reference points for various cables, including cables maintained and serviced by the first user and the second user. The first user and the second user can enter information related to maintenance and service of cables through the first client device 202 and the second client device 206. The information can be used to update the records of reference points maintained by the landmark server 204. The updated records of reference points can be used to dispatch the first user and the second user to geographically accurate locations in response to events detected in the cables. For example, a first event in a cable can be detected. The landmark server 204 can determine a physical length of the first event and a geographical location of the first event based on an optical length of the first event and a record of reference points maintained by the landmark server 204 for the cable. The landmark server 204 can provide information including the optical length of the first event, the physical length of the first event, and the geographical location of the first event to the first client device 202. The first user can use the information to quickly locate the first event and resolve the first event. The first user can also provide information that confirms or modifies the information provided by the landmark server 204. For example, the first user can provide a label describing a landmark associated with the first event, confirm the geographical location of the first event, or modify the geographical location of the first event. The information provided by the first user can be sent by the first client device 202 to the landmark server 204. The landmark server 204 can update the record of reference points for the cable based on the information provided by the first user. For example, a second event in the cable can be detected. The landmark server 204 can determine a physical length of the second event and a geographical location of the second event based on an optical length of the second event and the updated record of reference for the cable. The landmark server 204 can provide information including the optical length of the second event, the physical length of the second event, and the geographical location of the second event to the second client device 206. The second user can use the information to quickly locate the second event and resolve the second event. The second user can also provide information that confirms or modifies the information provided by the landmark server 204. All examples herein are provided for illustrative purposes, and there can be many variations and other possibilities.

Figure 3A:
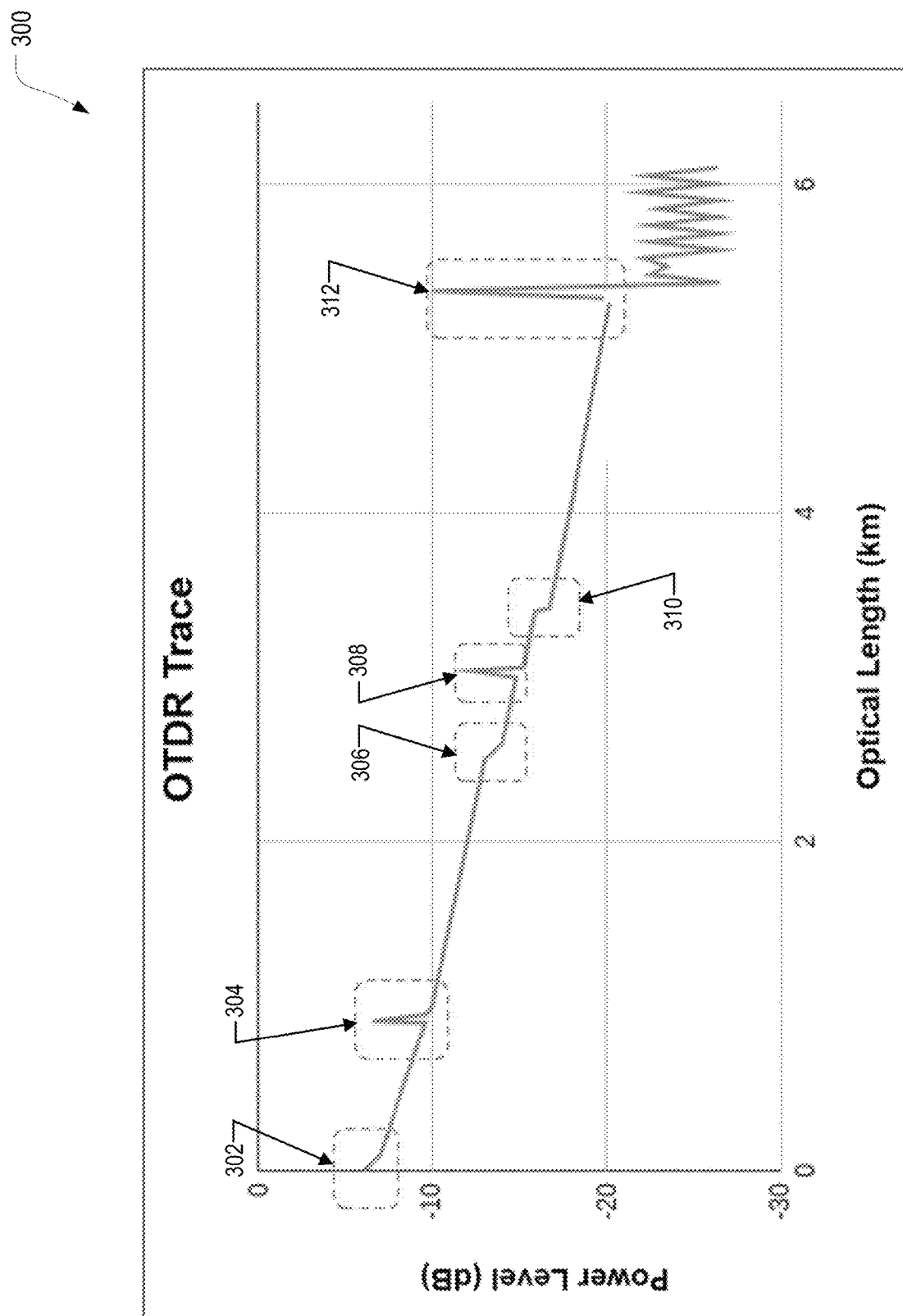
FIGS. 3A-3B illustrates example diagrams, according to an embodiment of the present technology.

FIG. 3A illustrates an example diagram 300, according to an embodiment of the present technology. The example diagram 300 illustrates an example graph of an OTDR trace of a fiber optic cable. The OTDR trace can be generated, for example, by an RFTS. In the example diagram 300, the OTDR trace shows a first event 302, a second event 304, a third event 306, a fourth event 308, a fifth event 310, and a sixth event 312. These events can correspond with landmarks of the fiber optic cable. For example, the first event 302 can correspond with a start of the fiber optic cable. The second event 304 can correspond with a first connector in the fiber optic cable. The third event 306 can correspond with a first splice in the fiber optic cable. The fourth event 308 can correspond with a second connector in the fiber optic cable. The fifth event 310 can correspond with a second splice in the fiber optic cable. The sixth event 312 can correspond with an end of the fiber optic cable. In some cases, an OTDR trace, such as one illustrated in the example diagram 300, can be used to configure a record of reference points for a cable. Based on measurements in the OTDR trace, landmarks in the cable can be determined. All examples herein are provided for illustrative purposes, and there can be many variations and other possibilities.

Figure 3B:
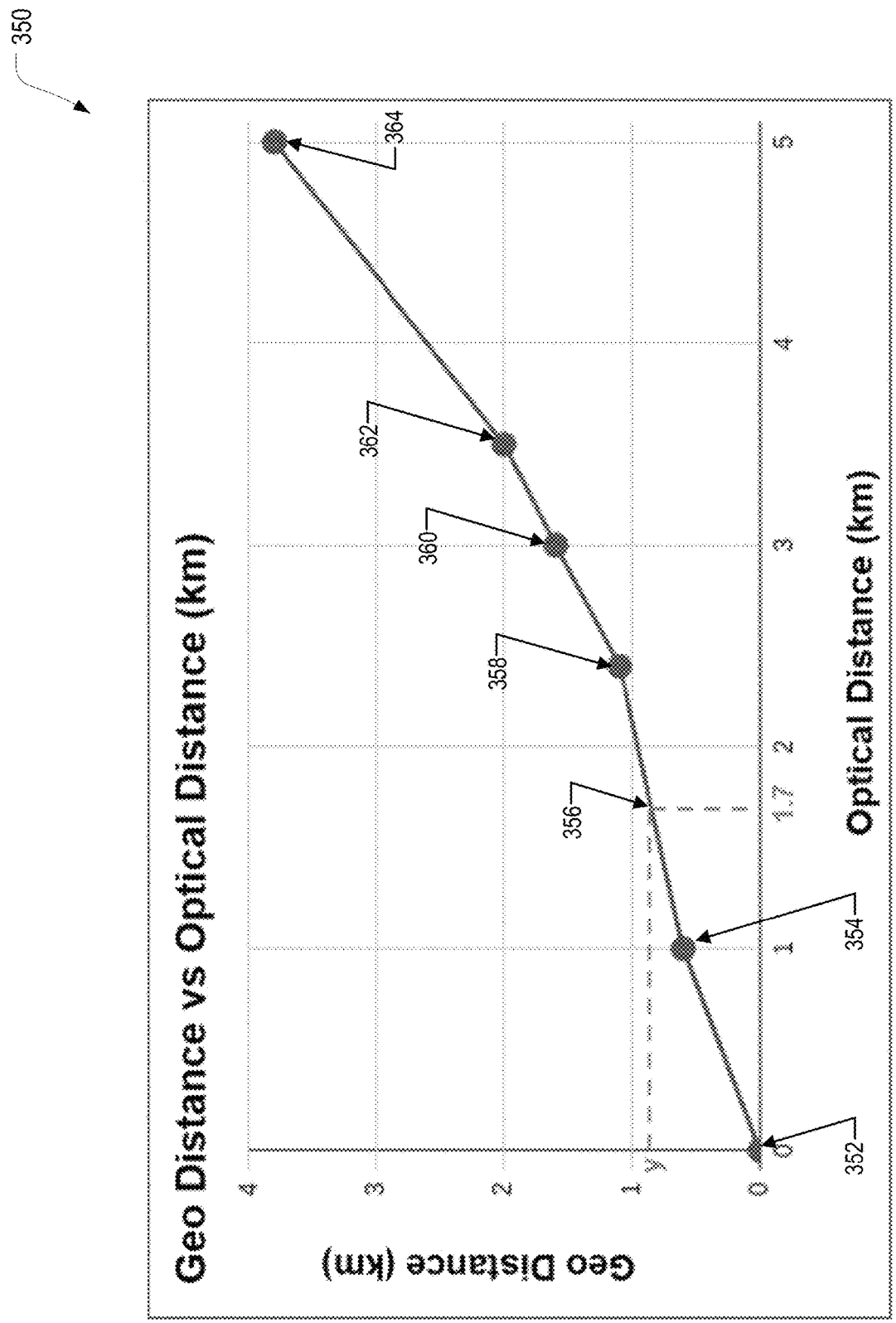

FIG. 3B illustrates an example diagram 350, according to an embodiment of the present technology. The example diagram 350 illustrates an example graph of geographical distance (e.g., physical length) in relation to optical distance (e.g., optical length) of a cable. In the example diagram 350, the cable can have a first landmark 352, a second landmark 354, a third landmark 358, a fourth landmark 360, a fifth landmark 362, and a sixth landmark 364. In this example, a geographical distance of an event 356 in the cable can be determined based on linear interpolation. For example, the event 356 can have an optical distance of 1.7 kilometers. Based on a linear interpolation between the second landmark 354 and the third landmark 358, the event 356 can be determined to have a geographical distance of y. All examples herein are provided for illustrative purposes, and there can be many variations and other possibilities.

Figure 4A:
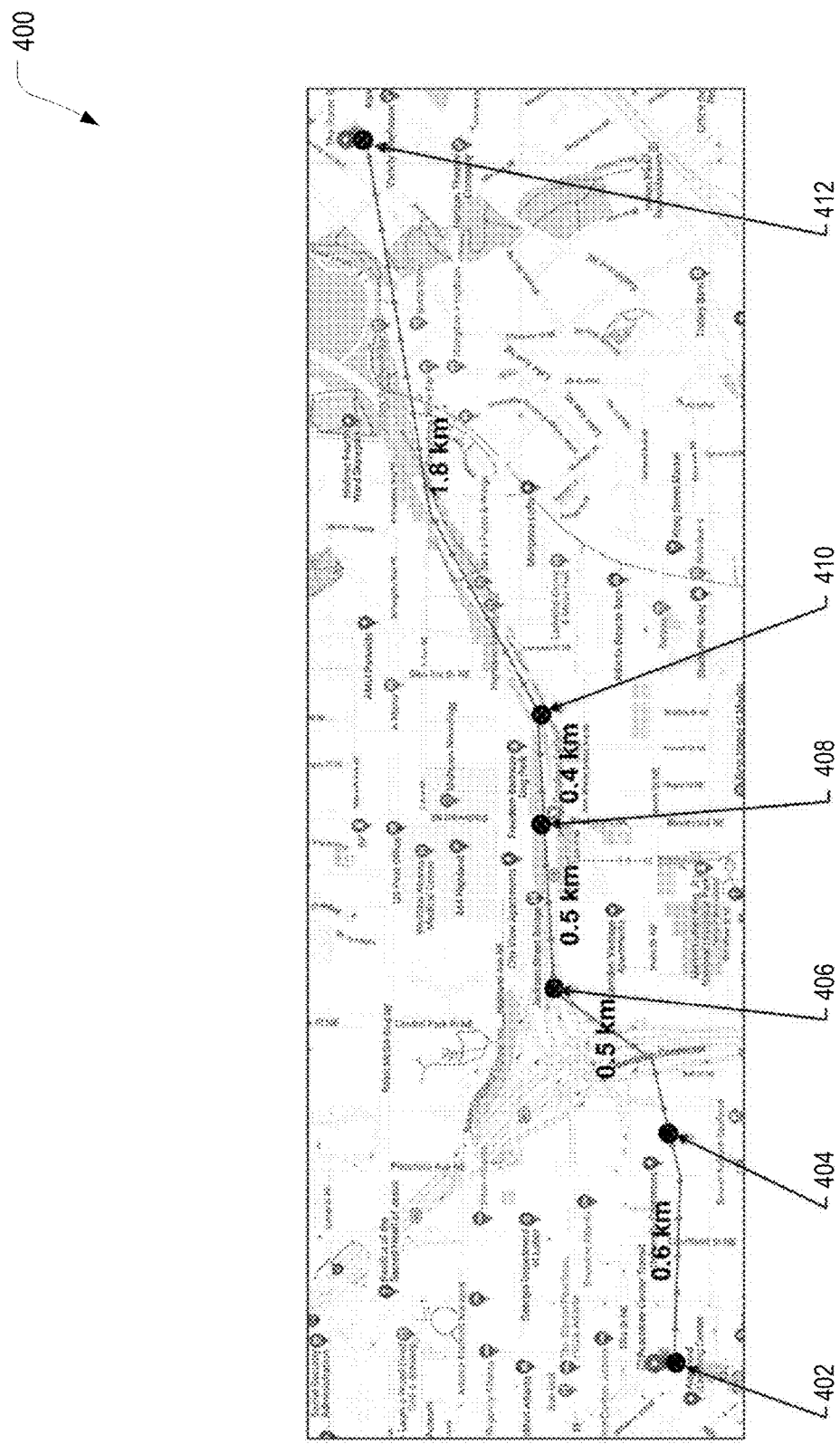
FIGS. 4A-4C illustrates example scenarios, according to an embodiment of the present technology.

FIG. 4A illustrates an example scenario 400, according to an embodiment of the present technology. The example scenario 400 illustrates a geographical route of how a cable was deployed. In the example scenario 400, the geographical route runs from a first landmark 402 (e.g., start of the cable) to a sixth landmark 412 (e.g., end of the cable). A second landmark 404 is 0.6 kilometers from the first landmark 402. A third landmark 406 is 0.5 kilometers from the second landmark 404. A fourth landmark 408 is 0.5 kilometers from the third landmark 406. A fifth landmark 410 is 0.4 kilometers from the fourth landmark 408. The sixth landmark 412 is 1.8 kilometers from the fifth landmark 410. As illustrated in the example scenario 400, a cable can be deployed with turn (curve) in the length of the cable. Locating an event in the cable can involve following the geographical route of the cable for a physical length of the event. All examples herein are provided for illustrative purposes, and there can be many variations and other possibilities.

Figure 4B:
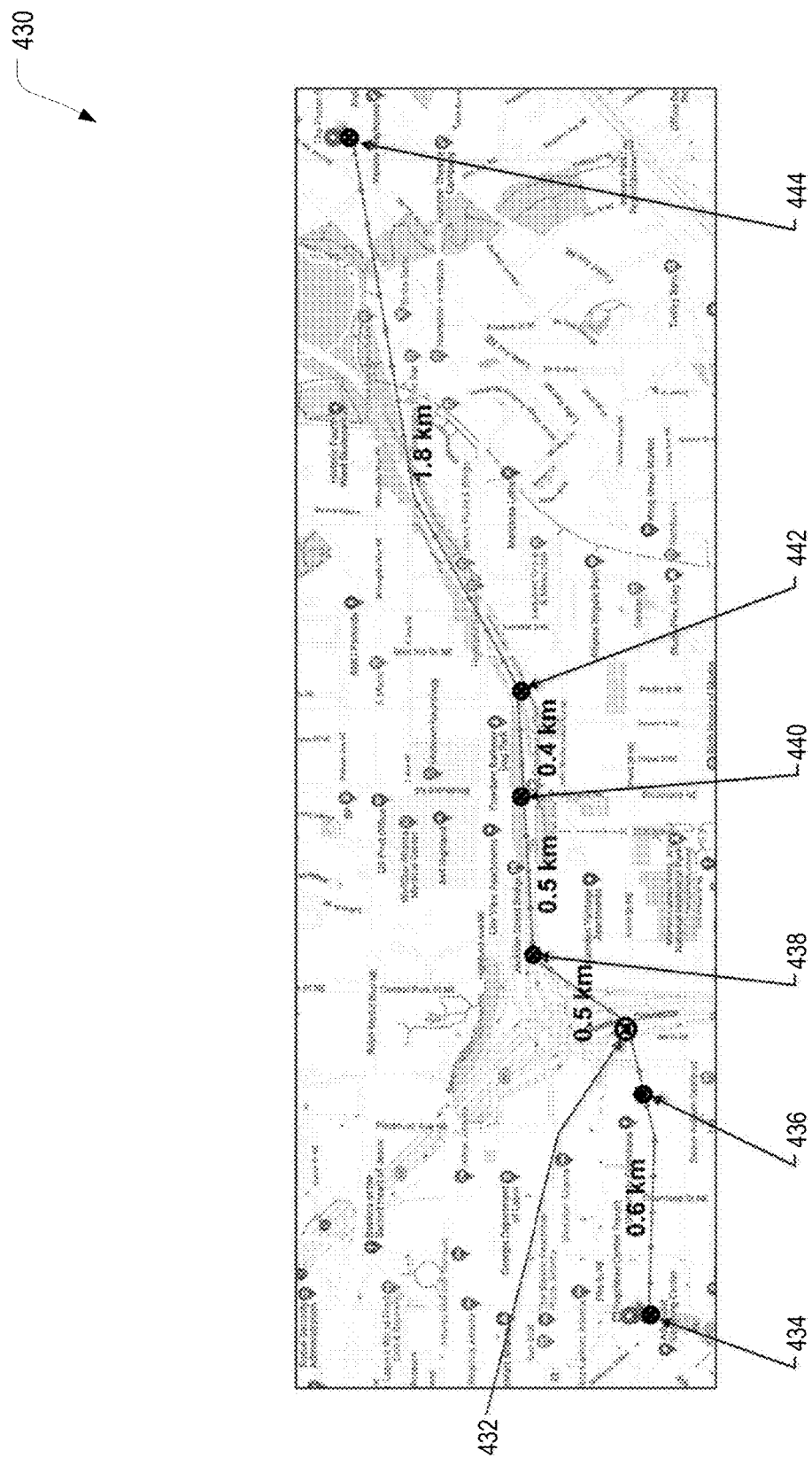

FIG. 4B illustrates an example scenario 430, according to an embodiment of the present technology. The example scenario 430 illustrates a geographical route of how a cable was deployed. In the example scenario 430, the geographical route runs from a first landmark 434 (e.g., start of the cable) to a sixth landmark 444 (e.g., end of the cable). A second landmark 436 is 0.6 kilometers from the first landmark 434. A third landmark 438 is 0.5 kilometers from the second landmark 436. A fourth landmark 440 is 0.5 kilometers from the third landmark 438. A fifth landmark 442 is 0.4 kilometers from the fourth landmark 440. The sixth landmark 444 is 1.8 kilometers from the fifth landmark 442. In this example, an event 432 is detected in the cable. Based on an optical length of the event 432, a physical length of the event 432 is determined as discussed herein. A geographical location of the event 432 can be determined by following the geographical route of the cable for the physical length of the event 432. All examples herein are provided for illustrative purposes, and there can be many variations and other possibilities.

Figure 4C:
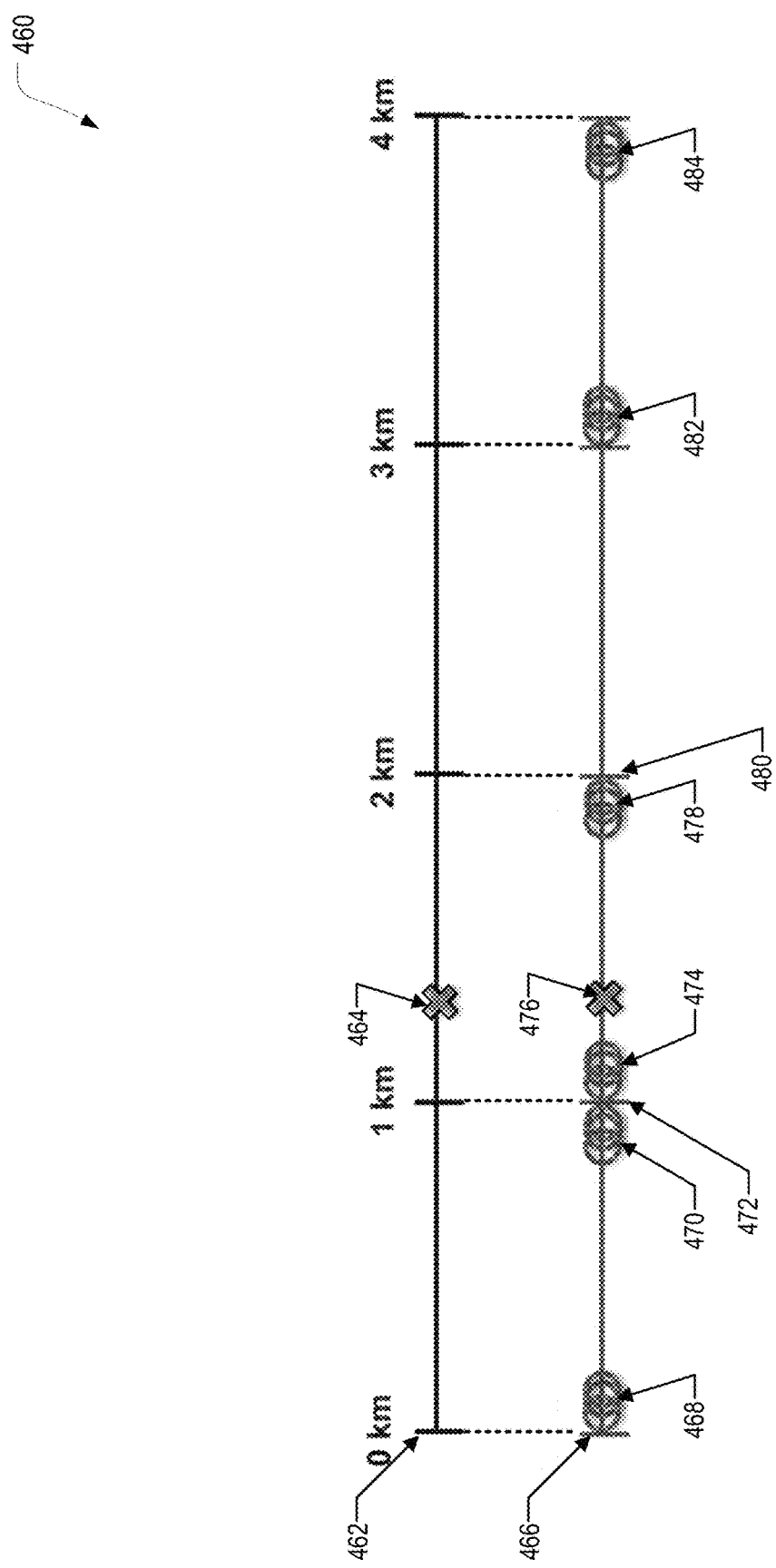

FIG. 4C illustrates an example scenario 460, according to an embodiment of the present technology. The example scenario 460 illustrates a physical length 462 of a cable with slack coils 468, 470, 474, 478, 482, 484 and an optical length 466 of the cable with the slack coils 468, 470, 474, 478, 482, 484. In the example scenario 460, an event can be detected in the cable. The event in the cable can have an optical length 476. A physical length 464 of the event in the cable can be determined based on the optical length 476. The physical length 464 can be determined using optical lengths and physical lengths of the closest reference points 472, 480 to the event. To compensate for slack coils 474, 478, the following formula can be applied:

$$L_X = X_1 + \frac{L_Y - \Delta 3 - Y_1}{Y_2 - \Delta 3 - \Delta 4} \times X_2$$

where $L_X$ is the physical length 464 of the event in the cable; $X_1$ is a physical length of the closest reference point 472; $L_Y$ is the optical length 476 of the event in the cable; $\Delta 3$ is an optical length of the slack coil 474; $Y_1$ is an optical length of the closest reference point 472; $Y_2$ is an optical length of the closest reference point 480; $\Delta 4$ is an optical length of the slack coil 478; $X_2$ is a physical length between the closest reference points 472, 480. In some cases, a start of a slack coil and an end of a slack coil can be reference points in a record of reference points for a cable. As illustrated in this example, if the start of the slack coil and the end of the slack coil are not recorded as reference points, a physical length of an event can still be determined based on an optical length of the event. All examples herein are provided for illustrative purposes, and there can be many variations and other possibilities.

Figure 5A:
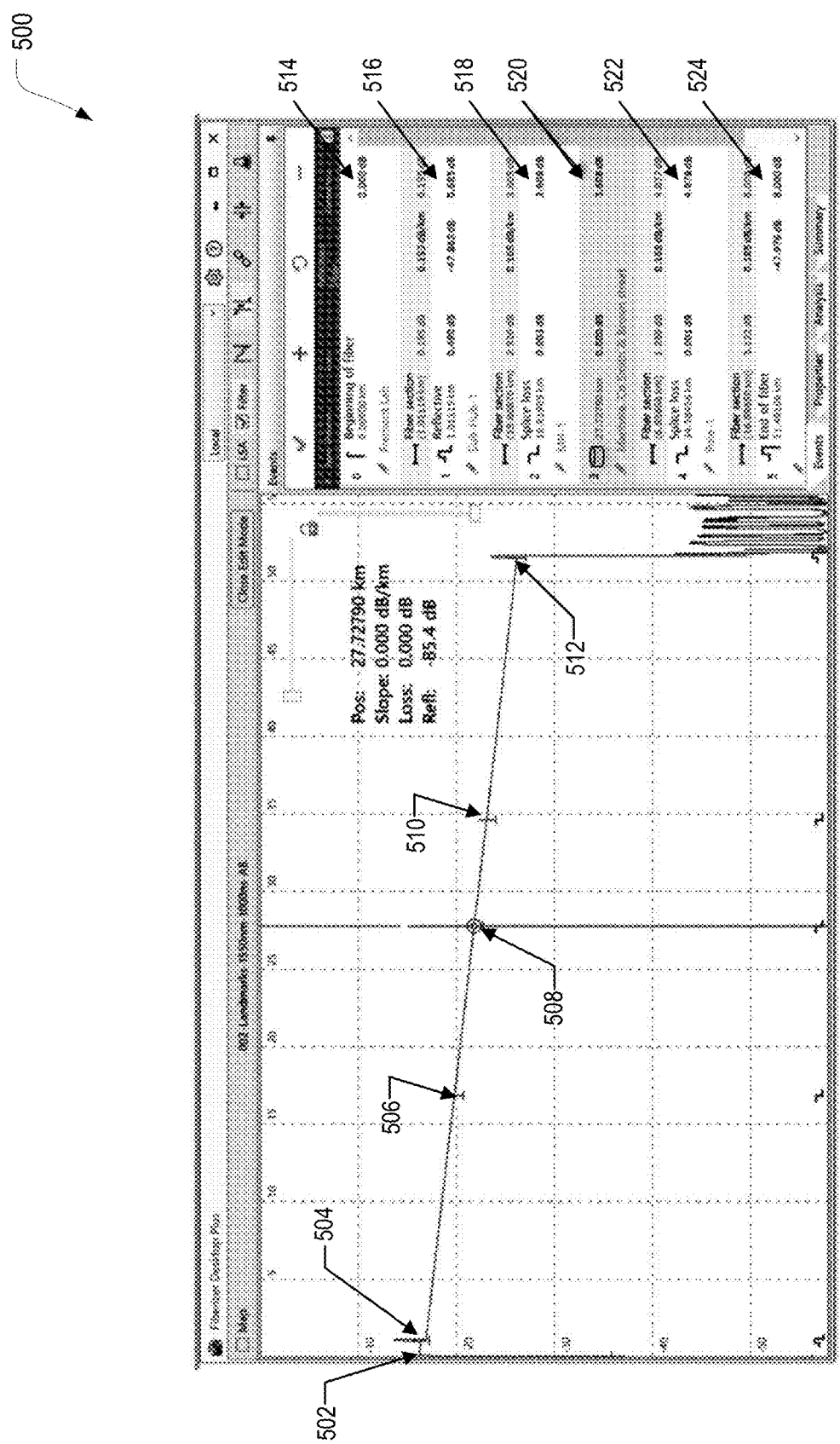
FIGS. 5A-5C illustrates example interfaces, according to an embodiment of the present technology.

FIG. 5A illustrates an example interface 500 that can be presented through a display of a computing system, according to an embodiment of the present technology. The example interface 500 displays an OTDR trace associated with a cable and a list of landmarks associated with the cable. In this example, a first landmark 502 (e.g., start of the cable) in the OTDR trace has a corresponding first item 514 in the list of landmarks. The first item 514 can indicate that the first landmark 502 is the start of the cable and provide information, such as physical length and attenuation measurements, for the first landmark 502. A second landmark 504 in the OTDR trace has a corresponding second item 516 in the list of landmarks. The second item 516 can indicate that the second landmark 504 is a reflector and provide information for the second landmark 504. A third landmark 506 in the OTDR trace has a corresponding third item 518 in the list of landmarks. The third item 518 can indicate that the third landmark 506 is a splice and provide information for the third landmark 506. A fourth landmark 508 in the OTDR trace has a corresponding fourth item 520 in the list of landmarks. The fourth item 520 can indicate that the fourth landmark 508 is a manhole and provide information for the fourth landmark 508. In this example, the fourth landmark 508 is a physical marker that does not affect the optical length of the cable. For example, the physical marker can be separate from the cable or the physical marker can be associated with zero optical length (e.g., no signal attenuation). Physical markers such as the fourth landmark 508 can be used as additional reference points for determining a physical length of an event. A fifth landmark 510 in the OTDR trace has a corresponding fifth item 522 in the list of landmarks. The fifth item 522 can indicate that the fifth landmark 510 is a splice and provide information for the fifth landmark 510. A sixth landmark 512 in the OTDR trace has a corresponding sixth item 524 in the list of landmarks. The sixth item 512 can indicate that the sixth landmark 512 is an end of the cable and provide information for the sixth landmark 512. All examples herein are provided for illustrative purposes, and there can be many variations and other possibilities.

Figure 5B:
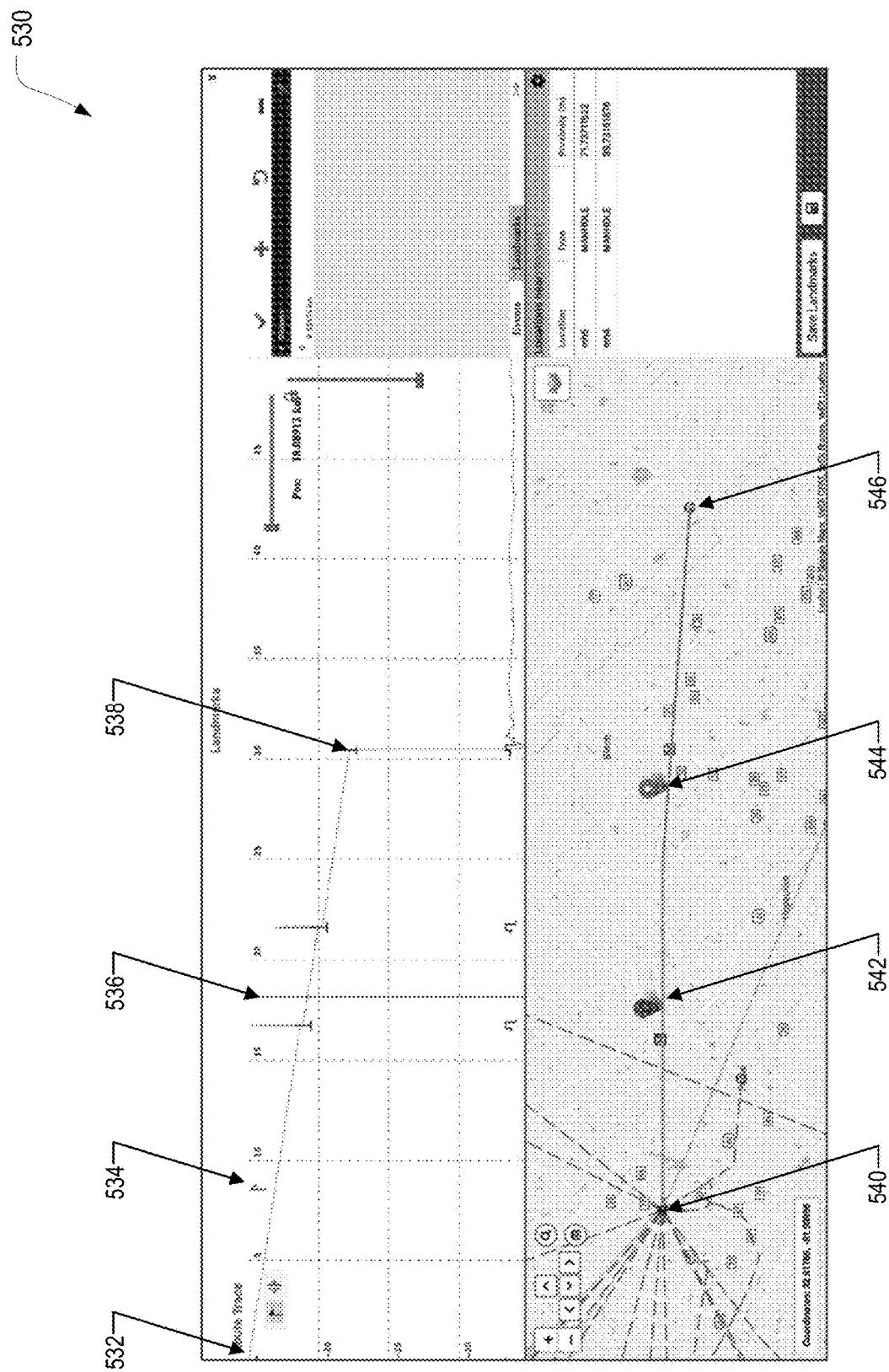

FIG. 5B illustrates an example interface 530 that can be presented through a display of a computing system, according to an embodiment of the present technology. The example interface 530 displays landmarks on an OTDR trace of a cable and corresponding geographical locations of the landmarks on a geographical map of the cable. In this example, the OTDR trace has a first landmark 532 (e.g., start of the cable), a second landmark 534, and a third landmark 538 (e.g., end of the cable). The first landmark 532 has a corresponding first geographical location 540 on the geographical map. The second landmark 534 has a corresponding second geographical location 542 on the geographical map. The third landmark 538 has a corresponding third geographical location 546 on the geographical map. In this example, an event 536 can be detected and displayed on the OTDR trace. The event 536 can have a corresponding event geographical location 544 on the geographical map. All examples herein are provided for illustrative purposes, and there can be many variations and other possibilities.

Figure 5C:
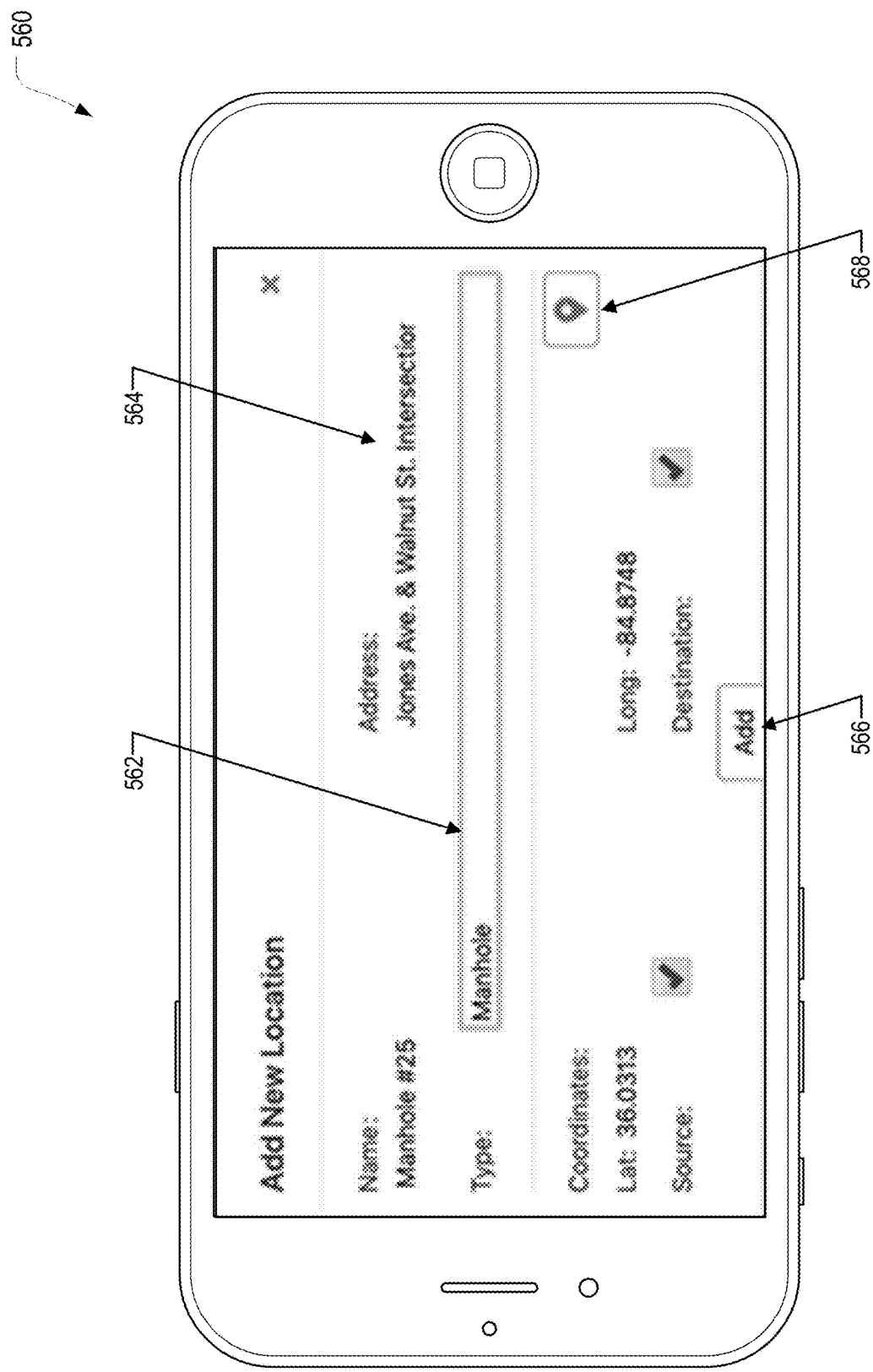

FIG. 5C illustrates an example interface 560 that can be presented through a display of a computing system, according to an embodiment of the present technology. The example interface 560 displays options for providing information related to a landmark. In this example, the example interface 560 includes an input field 562 for providing a type of landmark. The example interface 560 includes an address field 564 for providing a landmark associated with the landmark. The example interface 560 includes a location button 568 that provides latitudinal and longitudinal coordinates associated with the landmark. The example interface 560 includes an add button 566 that adds the information provided for the landmark to a record of reference points for a cable that includes the landmark. All examples herein are provided for illustrative purposes, and there can be many variations and other possibilities.

Figure 6:
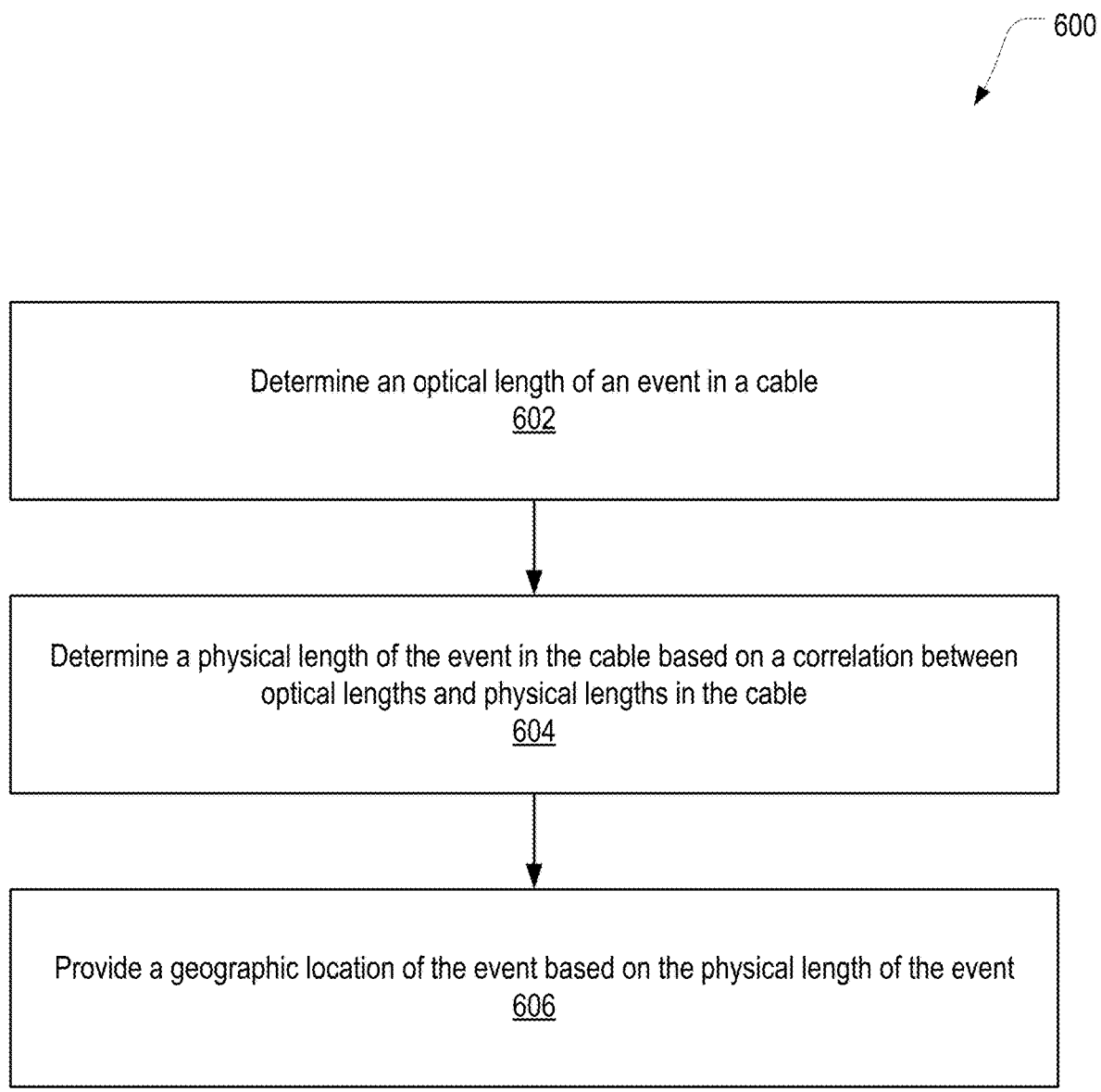
FIG. 6 illustrates an example method, according to an embodiment of the present technology.

FIG. 6 illustrates an example method 600, according to various embodiments of the present technology. It should be appreciated that there can be additional, fewer, or alternative steps performed in similar or alternative orders, or in parallel, within the scope of the various embodiments discussed herein unless otherwise stated. At block 602, the example method 600 determines an optical length of an event in a cable. At block 604, the example method 600 determines a physical length of the event in the cable based on a correlation between optical lengths and physical lengths in the cable. At block 606, the example method 600 provides a geographic location of the event based on the physical length of the event.

It is contemplated that there can be many other uses, applications, and/or variations associated with the various embodiments of the present technology. For example, various embodiments of the present technology can learn, improve, and/or be refined over time.

Hardware Implementation

Figure 7:
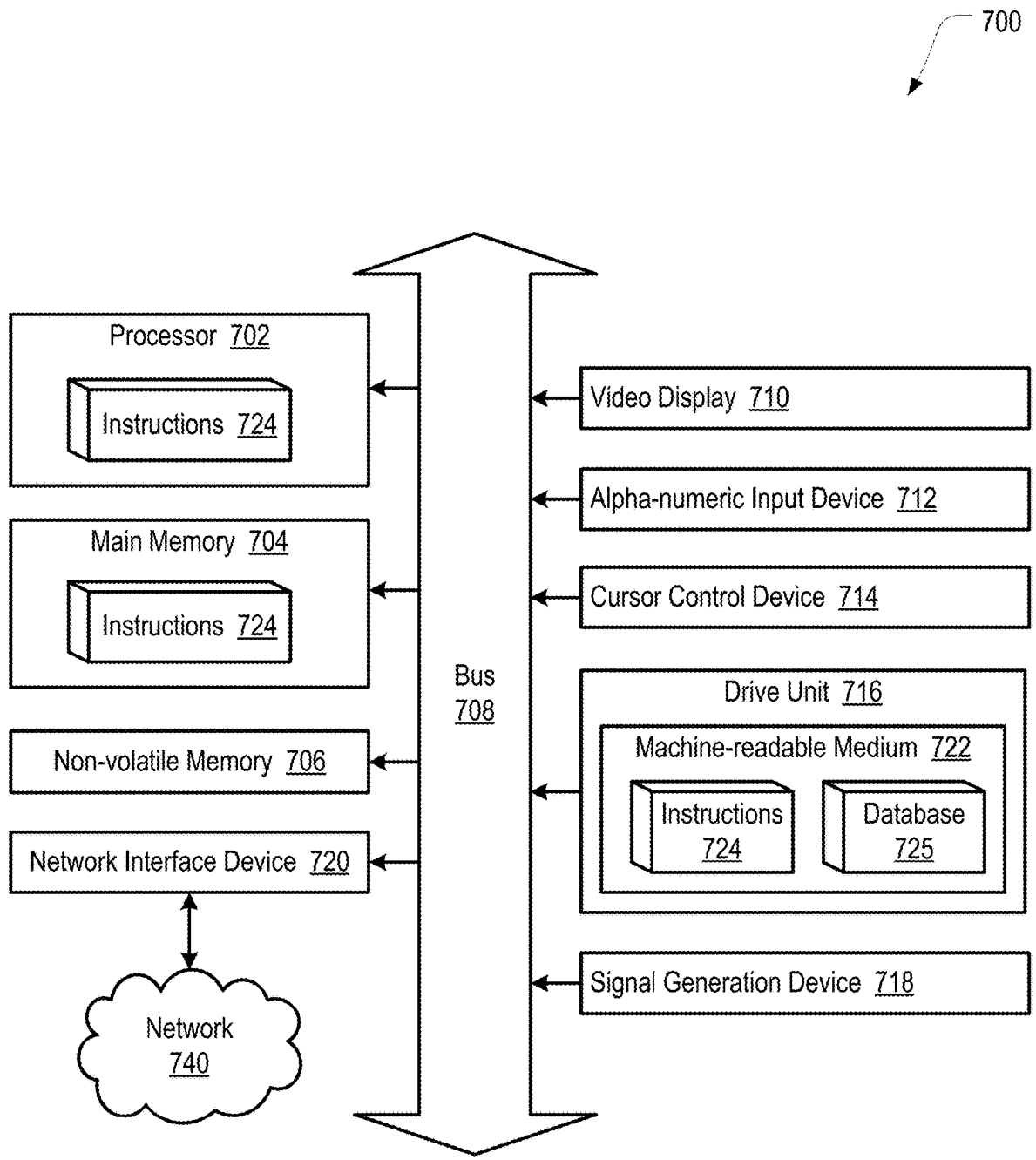
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions 724 for causing the computer system 700 to perform the processes and features discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a drive unit 716, a signal generation device 718 (e.g., a speaker) and a network interface device 720.

In one embodiment, the video display 710 includes a touch sensitive screen for user input. In one embodiment, the touch sensitive screen is used instead of a keyboard and mouse. The disk drive unit 716 includes a machine-readable medium 722 on which is stored one or more sets of instructions 724 (e.g., software) embodying any one or more of the methodologies or functions described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 722 also includes a database 725.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 700 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in both method and apparatus modes.

Further, each of the various elements of the invention and claims may also be achieved in a variety of manners. This technology should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   determining, by a computing system, an optical length of an event in a cable;
   determining, by the computing system, a physical length of the event in the cable based on a correlation between optical lengths and physical lengths in the cable, at least a first closest reference point of a first optical length shorter than an optical length of the event, and at least a second closest reference point of a second optical length longer than the optical length of the event; and
   providing, by the computing system, a geographic location of the event based on the physical length of the event.

2. The computer-implemented method of claim 1, wherein the first closest reference point is associated with a first geographical location and the second closest reference point is associated with a second geographical location.

3. The computer-implemented method of claim 1, wherein the determining the physical length of the event in the cable is further based on a linear interpolation that involves at least one of: the first optical length of the first closest reference point, a first physical length of the first closest reference point, the second optical length of the second closest reference point, or a second physical length of the second closest reference point.

4. The computer-implemented method of claim 1, further comprising:
   determining, by the computing system, a reference point for the cable based on a confirmation or a modification of the geographic location of the event.

5. The computer-implemented method of claim 1, further comprising:
   determining, by the computing system, the geographic location of the event based on a geographical route associated with the cable.

6. The computer-implemented method of claim 1, wherein the providing the geographic location of the event includes providing a geographical map that includes an indicator that indicates the geographical location of the event on the geographical map.

7. The computer-implemented method of claim 1, wherein the providing the geographic location of the event includes providing a latitudinal and longitudinal coordinate of the event.

8. The computer-implemented method of claim 1, wherein the determining the optical length of the event in the cable is based on an optical time domain reflectometer (OTDR) trace.

9. The computer-implemented method of claim 1, wherein the correlation between optical lengths and physical lengths in the cable is based on a record of reference points for the cable.

10. The computer-implemented method of claim 9, wherein the reference points include at least one of: a repair in the cable, a splice in the cable, a connector in the cable, a reflector in the cable, a splitter in the cable, or a slack coil in the cable.

11. A system comprising:
at least one processor; and
a memory storing instructions that, when executed by the at least one processor, cause the system to perform:
determining an optical length of an event in a cable;
determining a physical length of the event in the cable based on a correlation between optical lengths and physical lengths in the cable, at least a first closest reference point of a first optical length shorter than an optical length of the event, and at least a second closest reference point of a second optical length longer than the optical length of the event; and
providing a geographic location of the event based on the physical length of the event.

12. The system of claim 11, wherein the first closest reference point is associated with a first geographical location and the second closest reference point is associated with a second geographical location.

13. The system of claim 11, wherein the determining the physical length of the event in the cable is further based on a linear interpolation that involves at least one of: the first optical length of the first closest reference point, a first physical length of the first closest reference point, the second optical length of the second closest reference point, or a second physical length of the second closest reference point.

14. The system of claim 11, wherein the instructions further cause the system to perform:
determining a reference point for the cable based on a confirmation or a modification of the geographic location of the event.

15. The computer-implemented system of claim 11, further comprising:
determining the geographic location of the event based on a geographical route associated with the cable.

16. A non-transitory computer-readable storage medium including instructions that, when executed by at least one processor of a computing system, cause the computing system to perform:
determining an optical length of an event in a cable;
determining a physical length of the event in the cable based on a correlation between optical lengths and physical lengths in the cable, at least a first closest reference point of a first optical length shorter than an optical length of the event, and at least a second closest reference point of a second optical length longer than the optical length of the event; and
providing a geographic location of the event based on the physical length of the event.

17. The non-transitory computer-readable storage medium of claim 16, wherein the first closest reference point is associated with a first geographical location and the second closest reference point is associated with a second geographical location.

18. The non-transitory computer-readable storage medium of claim 16, wherein the determining the physical length of the event in the cable is further based on a linear interpolation that involves at least one of: the first optical length of the first closest reference point, a first physical length of the first closest reference point, the second optical length of the second closest reference point, or a second physical length of the second closest reference point.

19. The non-transitory computer-readable storage medium of claim 16, wherein the instructions further cause the computing system to perform:
determining a reference point for the cable based on a confirmation or a modification of the geographic location of the event.

20. The non-transitory computer-readable storage medium of claim 16, further comprising:
determining the geographic location of the event based on a geographical route associated with the cable.

* * * * *